Nov. 3, 1970    A. J. YERMAN    3,537,319
SILICON DIAPHRAGM WITH OPTIMIZED INTEGRAL STRAIN GAGES
Filed July 26, 1968    2 Sheets-Sheet 1

Inventor:
Alexander J. Yerman,
by Donald R. Campbell
His Attorney.

Inventor:
Alexander J. Yerman,
by Donald R. Campbell
His Attorney.

United States Patent Office 3,537,319
Patented Nov. 3, 1970

3,537,319
SILICON DIAPHRAGM WITH OPTIMIZED INTEGRAL STRAIN GAGES
Alexander J. Yerman, Scotia, N.Y., assignor to General Electric Company, a corporation of New York
Filed July 26, 1968, Ser. No. 747,917
Int. Cl. G01i 9/04
U.S. Cl. 73—398    3 Claims

ABSTRACT OF THE DISCLOSURE

A circular, restrained edge, pressure responsive diaphragm device comprises a (110) cut of n-type silicon having at least one pair of integral p-type elongated strip strain gages respectively located at the center and toward the outer edges near the radial position of zero tangential stress, and oriented at selected crystallographic directions so as to optimize the sensitivity of each gage. In a full bridge or half bridge resistance measuring circuit, both series connected gages are active and result in additive opposite sign resistance changes whereby increased output and improved linearity are obtained.

---

This invention relates to monocrystalline silicon diaphragms with integral semiconductor strain gages for sensing pressure, and more particularly to an optimized arrangement of the semiconductor strain gages to obtain increased output and improved linearity of output.

The piezoresistive effect, defined as the change in resistivity with applied stress, is especially pronounced in certain semiconductors such as silicon and germanium and results from the strain-induced modulation of the conduction mechanism of the semiconductor. Because of the large gage factors that consequently can be obtained, these semiconductors when oriented in selected crystallographic directions have been employed as strain gages for sensing various types of stresses including pressure. In addition to the large piezoresistive coefficients, another advantage of the semiconductor strain gage is that gage elements of one conductivity type can be formed integrally in or on a semiconductor substrate of the opposite conductivity type by standard fabrication techniques, in which case they can be electrically isolated from the substrate by back biasing the p-n junction which exists between the strain gage and substrate materials. A single crystal semiconductor diaphragm with integral strain gages of this kind for sensing pressure comprises a thin circular wafer of the semiconductor material securely mounted at the edges so that the unrestrained central portion is deformed as a function of the pressure applied to it. Semiconductor strain gages formed integrally in or on the diaphragm exhibit a change in resistance when strained to yield a measure of the applied pressure. In prior available devices a plurality of gage elements have been employed at different locations on the diaphragm, however the central gages are the only active gages and the outer gages are inactive and used for temperature compensation only. The present invention is directed to improving the performance of an integral monocrystalline silicon diaphragm pressure gage of this general type.

It is therefore an object of the invention to provide an improved single crystal semiconductor diaphragm with integral strain gages wherein the semiconductor strain gages in combination have an increased output and improved linearity of output in response to an unbalanced pressure acting across the diaphragm.

Another object is the provision of an improved integral monocrystalline silicon diaphragm pressure gage having central and outer strain gage elements arranged in a unique orientation so that all of the gage elements contribute equally to the total output in terms of fractional change of resistance.

In accordance with the invention, a semiconductor strain gage device for sensing pressure comprises a restrained edge, circular pressure responsive diaphragm made of (110) oriented single crystal n-type silicon having a preselected radius. At least one pair of active p-type silicon strain gages are formed integrally on the diaphragm and include a central gage subject to tensile strain and an outer gage subject to compressive strain. The central gage comprises at least one elongated strip having its center at or adjacent to the center of the diaphragm and oriented so that its longitudinal direction is parallel to the $<1\bar{1}0>$ crystallographic direction. The outer gage likewise comprises at least one radially directed elongated strip centered about the radial position of the diaphragm at which the tangential stress component is zero. The longitudinal direction of this outer gage is oriented to be parallel to the $<\bar{1}11>$ or $<1\bar{1}1>$ direction. The central and outer gages of each pair are preferably connected in series circuit relationship and form a resistance divider network or full Wheatstone bridge circuit (when two pairs are used) such that the opposite sign resistance changes occurring in the central and outer gages as a function of applied pressure are additive, thereby providing improved performance.

The foregoing and other objects, features, and advantages of the invention will be apparent from the following more particular description of a preferred embodiment of the invention, as illustrated in the accompanying drawings wherein.

Figure 1:
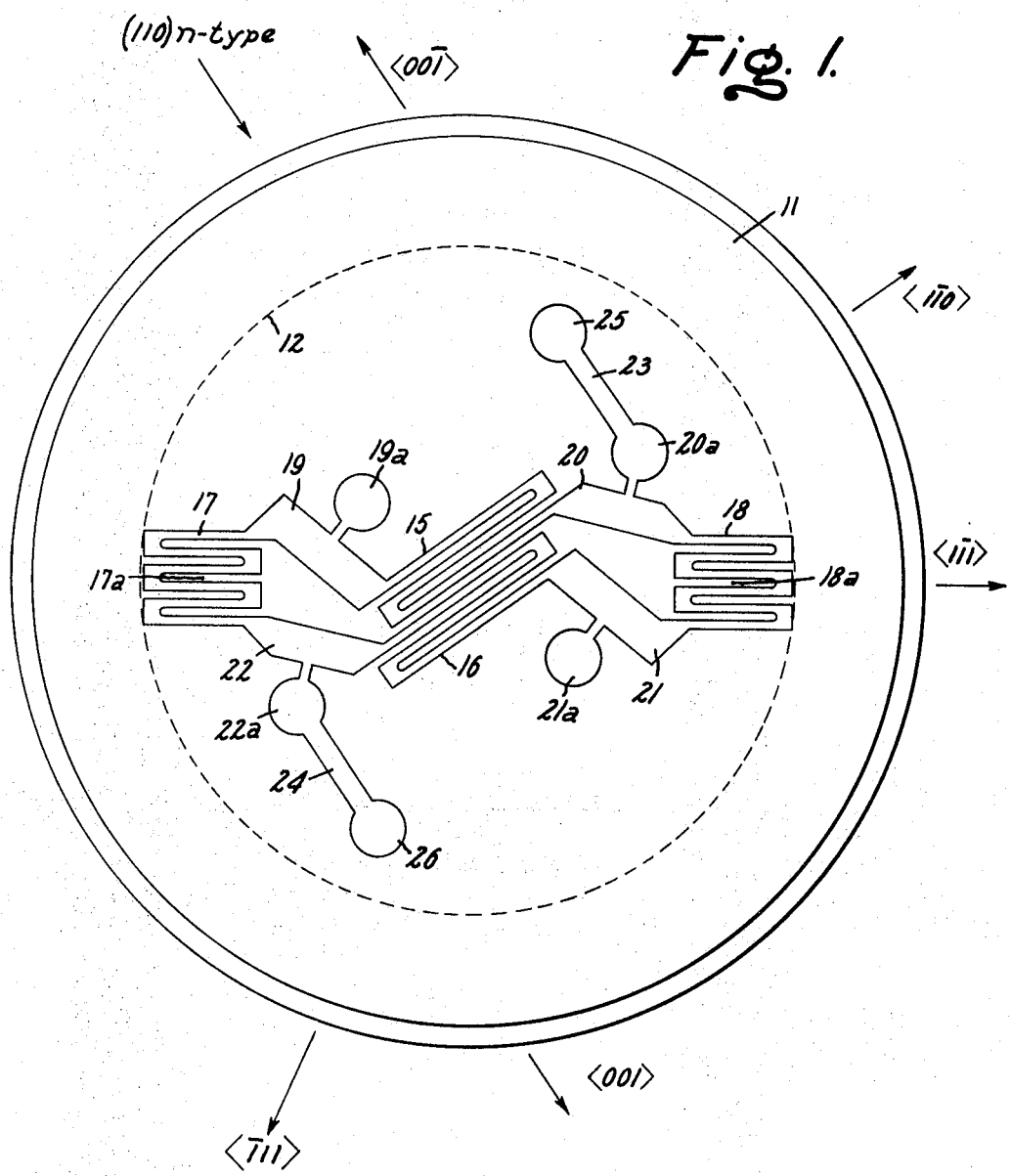
FIG. 1 is a plan view of the integral single crystal silicon pressure sensing diaphragm per se showing the orientation of the individual strain gage elements and interconnecting members.
Figure 2:
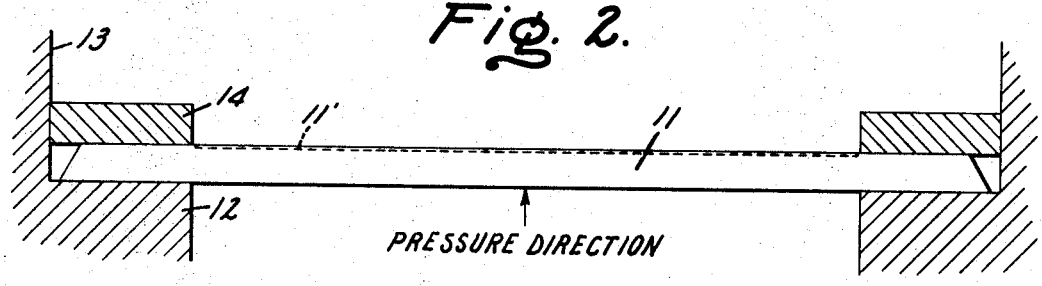
FIG. 2 is a side view of the diaphragm of FIG. 1 suitably mounted rigidly at the edges to generate the desired strain distribution when subjected to a pressure differential in the direction indicated.

Referring to FIGS. 1 and 2, a stress responsive diaphram 11 comprises a thin wafer of n-type silicon semiconductor material cut from a single crystal of silicon so as to have a (110) crystallographic orientation. The monocrystalline silicon diaphragm 11 has a circular shape, and is edge restrained so that only the portion of the diaphragm within the dashed line 12 flexes in response to pressure stresses. Typically, the edges of the diaphragm 11 are rigidly mounted between the shoulder of a housing structure 13 and an overlying retaining ring 14. As is indicated by the arrow, pressure transmitted through a fluid within the smaller diameter bore acts approximately axially against the adjacent surface of the diaphragm 11, flexing it outwardly as a function of the magnitude of the pressure.

A plurality of semiconductor strain gages of opposite conductivity type, i.e., p-type silicon, are formed integrally on the outer surface of the diaphragm 11 as indicated generally at 11' in FIG. 2, out of contact with the pressure transmitting fluid. These p-type strain gages are formed on the one surface of the n-type substrate 11 by techniques well known in the semiconductor art, such as by the epitaxial deposition of silicon on the substrate diaphragm or by a diffusion process. There are more specifically two central gage elements 15 and 16, and two outer gage elements 17 and 18. Each of the individual gage elements comprises at least one elongated strip of p-type silicon, although as illustrated, each gage element can comprise several elongated p-type silicon strips folded back parallel to one another accordion fashion in order to increase the length-to-width ratio and hence resistance of an element located within a given area of the diaphragm 11.

In accordance with the invention, the strain gage elements 15 and 16 are located at or adjacent to the center of the diaphragm 11 and are oriented in the $<\bar{1}10>$ crystallographic direction, which is at an angle of about 35° from the horizontal as shown in FIG. 1. The two central gage elements 15 and 16 are preferably symmetrical with the center of the diaphragm. The two outer gage elements 17 and 18, on the other hand, are oriented in either of the $<1\bar{1}1>$ or $<\bar{1}11>$ crystallographic directions, the former being here illustrated. The center of the elongated strip making up each respective gage element, or of the group of strips reverse folded back upon one another, is furthermore located at a radial position 17a or 18a that is a predetermined fraction of the radius of the unrestrained portion of the diaphragm 11.

Figure 4:
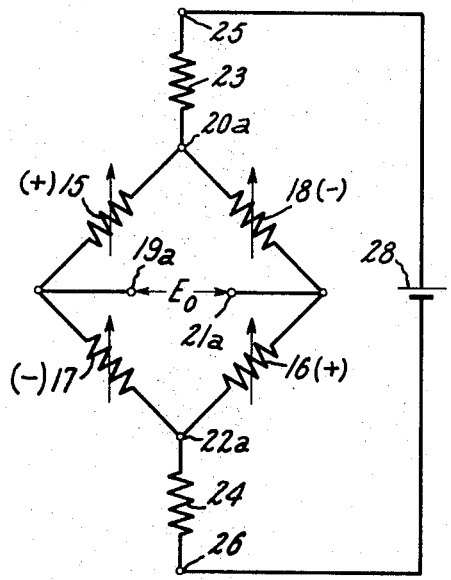
FIG. 4 is a schematic circuit diagram of the equivalent resistances for the four active gage elements of FIG. 1 connected in a Wheatstone bridge arrangement to measure the output.

Certain other features of the p-type silicon pattern formed integrally on one face of the monocrystalline diaphragm 11 will be referred to before proceeding to an explanation of the reasons for the particular orientations of the strain gage elements 15–18 already discussed. The four strain gage elements 15–18 are connected in series circuit relationship by means of four relatively low resistance connections 19–22. Each of these low resistance connections is in turn connected by a small neck to a contact pad respectively indicated at 19a–22a. With this arrangement, it can be seen that the strain gage elements are connected in a Wheatstone bridge configuration wherein each of the individual gage elements is a variable resistance, and the unbalance output voltage is sensed between two opposite contact pads, such as 19a and 21a, while the D-C supply voltage is applied between the other opposing pair of contact pads, in this case, the contact pads 20a and 22a. As a temperature compensating feature, series resistance strips 23 and 24 (see also FIG. 4) are connected to the contact pads 20a and 22a and respectively terminate in other contact pads 25 and 26. The series resistance strips 23 and 24 are both oriented in the $<001>$ crystallographic direction. It will be noted that when a source of voltage is connected between the contact pads 25 and 26, causing a current to flow through the circuit elements represented by the p-type silicon pattern formed integrally on the surface of the n-type silicon substrate 11, that the current flow is constrained to the p-type elements because of the existence of a p-n rectifying barrier between the opposite conductivity pattern and substrate. By way of example of typical dimensions, the active diaphragm is 116 mils in diameter, the elongated gage strips are one to several mils in width, and the strips in gages 15 and 16 are 32 mils long while those in gages 17 and 18 are 15 mils long.

The orientation and location of the gage elements 15–18 on the silicon substrate diaphragm 11 is such that improved output is obtained when the gages are operated as series connected pairs of central and outer gages in a full bridge or half bridge circuit for determining the amount of strain, and hence the applied pressure. It is well known that in a crystal of semiconductor material such as silicon the transverse and longitudinal piezoresistance coefficients are different for different crystyllographic axes of the crystal. The longitudinal piezoresistance coefficient refers to the change in resistivity when current and strain directions are parallel to one another, whereas the transverse piezoresistance coefficient refers to the change in resistivity when current and strain directions are perpendicular to each other and lie within the plane of the diaphragm. When the piezoresistance coefficient is large, it will be understood that the strain-induced change in resistivity will also be large. The (110) silicon cut of which the diaphragm 11 is made is a unique plane in that it contains all three of the previously mentioned crystallographic directions. P-type gages are desirable because of the favorable gage factor values, and also because it is possible to make low resistance ohmic contacts to the p-type silicon gages, whereas it is difficult to form equally low resistance ohmic contacts to n-type silicon. To further understand the reasons for choosing these particular crystallographic directions, reference is made to FIG. 3 which shows curves for the radial and tangential stress components for silicon in a circular diaphragm. The ratio of the stress at radial position $r$ with respect to the stress at the center of the diaphragm is plotted against the ratio $r/a$, where $a$ is the radius of the unrestrained portion of the diaphragm. It can be seen from this graph that the gage elements are subject to both radial and tangential stress components along their active length except for the two radial locations (approximately $0.64r$ and $0.82r$) where the radial and tangential stresses respectively are zero. Furthermore, gage elements located toward the center of the diaphragm will be in tension (the ordinate value is positive), while gage elements located near the periphery of the unrestrained portion of the diaphragm will be in compression (the ordinate value is negative).

Figure 3:
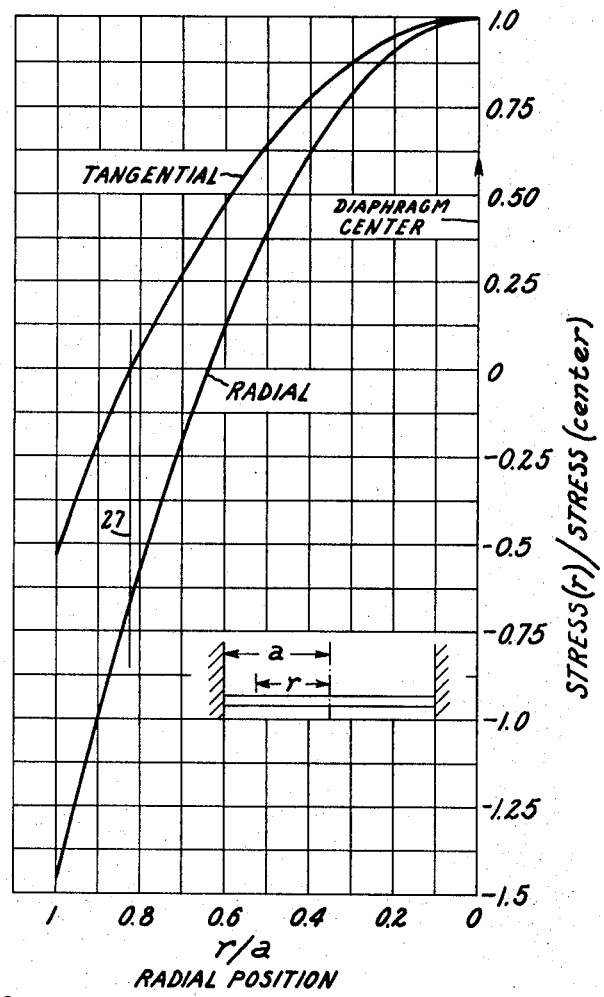
FIG. 3 is a plot of the ratio of the stress at radial position $r$ to the stress at the center of the circular diaphragm with respect to radial position as indicated by the ratio $r/a$, where $a$ is the radius of the active portion of the diaphragm, showing characteristic curves of radial and tangential stress distribution for silicon.

The central gages 15 and 16 are subject to both longitudinal and transverse strains along their active length as is also evident in FIG. 3. The $<1\bar{1}0>$ orientation is most desirable here since the sensitivity of p-type silicon semiconductor material to transverse strain approaches zero while its sensitivity to longitudinal strain is high. Thus, any transverse strain applied to the central gages does not reduce their output, or reduces their individual output only negligibly. Exposure of the gage elements to approximately equal amplitudes of longitudinal and transverse strains as will occur near the diaphragm center consequently will reduce sensitivity by only a negligible amount. For example, with p-type silicon gages having a resistivity of 0.01 ohm-centimeter, the longitudinal gage factor is $+70$ while the transverse gage factor is $-0.4$. Gage factor is defined as $$\frac{\Delta R/R}{\Delta l/l}$$

where $\Delta l/l$ is the strain. The outer gages 17 and 18 are best oriented in either the $<1\bar{1}1>$ or $<\bar{1}11>$ directions. In these crystallographic directions, the longitudinal strain sensitivity is at its maximum, and while there is also a substantial transverse sensitivity this does not detract from the over-all sensitivity provided the gage is located at a radial position where transverse strain is negligible. For example, by locating the center of each outer gage at a radial distance such that the ratio $r/a=0.82$, transverse strain approaches a zero average and the higher longitudinal sensitivity of the orientation is fully realized. The reason for locating the respective centers 17a and 18a of the outer gages at this predetermined radial location can be seen in FIG. 3, by noting that the tangential stress component is 0 when the abscissa value is 0.82. For this radial position, it is seen from FIG. 3 that the radial (or longitudinal) strain to which the outer gages 17 and 18 are subjected is approximately 70 percent of the radial strain at the center of the diaphragm, but is opposite in sign. For the example given, the longitudinal gage factor is +102 while the transverse gage factor is −44. Thus, the product of the gage factor (+102) and the relative strain level (−0.70) yields a sensitivity approximately equal and opposite to that of the centrally located gages characterized by a gage factor of +70 and a relative strain level of +1.0. Consequently, any one pair of gages comprising a central gage and an outer gage provide resistance changes which are comparable in magnitude and opposite in sign.

It follows that any one pair consisting of a series connected central gage and an outer gage give additive outputs in a half bridge configuration (FIG. 5), the central gage being loaded in tension and the outer gage in compression. Two pairs make up a full bridge configuration with all active arms. In the Wheatstone bridge type measuring circuit shown in FIG. 4, the sign of the strain-induced resistance change, which in turn is a function of the pressure exerted on the diaphragm 11, is indicated in parentheses following the numeral designation of each of the gage elements. Since the resistance of the gage elements changes as a function of the applied stress or strain, the equivalent circuit representation of a gage element is a variable resistor. The two series resistors 23 and 24 optionally included as a temperature compensation feature do not contribute to the resulting unbalance voltage $E_o$ because they are oriented (FIG. 1) in the <001> crystallographic direction and are non-strain sensitive. In this direction the silicon semiconductor material has approximately zero longitudinal and transverse sensitivity to strain. A suitable source of unidirectional voltage such as battery 28 is connected to the circuit points 25 and 26 at the ends of the series resistors. A specific example given in the following Table 1 may be helpful in understanding the contribution of the individual gage elements in the Wheatstone bridge arrangement. In the context of the invention, one pair of series connected central and outer gages 16 and 18 are in turn connected in parallel circuit relationship with another pair of series connected gages 15 and 17, with the gages in the two pairs in reverse order so that each gage contributes to the unbalance voltage $E_o$. In this table $\epsilon_c$ is the strain at the diaphragm center in in./in.

between circuit points 20a and 22a. The movable tap of the potentiometer 29 is connected to a null detector 30 which in turn is connected to the circuit point 21a between the gage elements 16 and 18. When the movable tap on the potentiometer is adjusted such that the null detector 30 indicates a null, the relative values of the two portions of the potentiometer 29 are indicative of the pressure applied to the diaphragm 11. The half bridge circuit arrangement also obtains twice the resistance change as compared to the prior art diaphragms wherein only one central gage would be active.

The significant increase in usable output is especially advantageous with an integral diaphragm design because such designs are usually limited to low currents because of the relatively poor heat sinking, in contrast to a gage bonded on a heavy metal diaphragm. Where output is not critical, the sensitivity permits operation at lower diaphragm strain levels. This results in improved linearity of output and higher over-pressure capability.

In summary, improved performance of a monocrystalline silicon diaphragm with integral strain gages for sensing pressure is achieved by an optimized arrangement of one or more pairs of central and outer strain gages located and oriented relative to the crystallographic axes of the silicon so as to maximize the strain induced change in resistance. The unique set of crystallographic axes for this gage arrangement for p-type strain gage elements is found only in a (110) plane. Increased output and improved linearity are obtained because all gages are active and contribute approximately equally to the output of a Wheatstone bridge type circuit such that the output voltage obtained is a linear function of applied pressure.

While the invention has been particularly shown and described with reference to preferred embodiments thereof, it will be understood by those skilled in the art that various changes in form and details may be made therein without departing from the spirit and scope of the invention.

What I claim as new and desire to secure by Letters Patent of the United States is:

1. A semiconductor strain gage device for sensing pressure comprising
   a circular pressure responsive diaphragm made of (110) plane single crystal n-type silicon having a preselected radius, and means for restraining the edges of said diaphragm,
   a plurality of active p-type silicon strain gages formed integrally on one surface of said diaphragm including a pair of central gages subject to tensile strain and a

TABLE 1

| Location of gage center | Average longitudinal strain, $\epsilon_L$ | Average transverse strain, $\epsilon_T$ | $GF_L$ | $GF_T$ | Output contribution $\left(\dfrac{\Delta R}{R}\right)_i = (GF_L)\epsilon_L + (GF_T)\epsilon_T$ |
|---|---|---|---|---|---|
| $\dfrac{r}{a}=0$ | 0.93 $\epsilon_o$ | 0.95 $\epsilon_o$ | 70 | −0.4 | +65 $\epsilon_o$ |
| $\dfrac{r}{a}=0.82$ | −0.65 $\epsilon_o$ | 0 | 102 | −44 | −66 $\epsilon_o$ |

NOTE: Total output: $i = \sum_{1,4} \left(\dfrac{\Delta R}{R}\right)_i$ for full bridge—262$\epsilon_o$ From this table it is seen that for the locations and orientations selected for the four gage elements 15–18, each gage contributes approximately the same amount to the total output in terms of fractional change in the resistance. In contrast to this approach, available prior art pressure responsive diaphragms of this type use active gages only at the center, and the outer gages are inactive and are used for temperature compensation only. There is consequently an increase in output by a factor of two.

Figure 5:
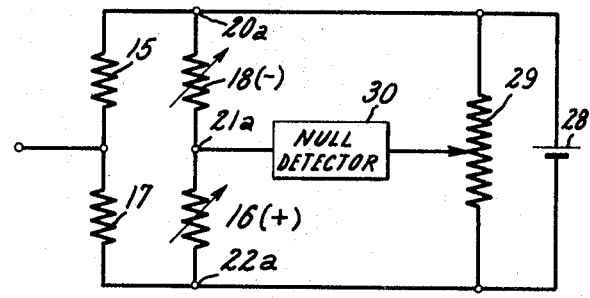
FIG. 5 is a schematic circuit diagram for a half bridge configuration utilizing two active gage elements including one central gage and one outer gage.

A pair of gage elements comprising a central gage and an outer gage can also be connected in a half bridge or resistance divider network configuration as shown in FIG. 5. In this circuit, assuming that the series resistors 23 and 24 are not used, a potentiometer 29 is connected pair of outer gages subject to compressive strain,
said pair of central gages being disposed substantially parallel to one another centered about the center of said diaphragm and each comprising at least one elongated strip oriented longitudinally in the <1$\bar{1}$0> crystallographic direction, whereby the longitudinal strain sensitivity is high and the transverse strain sensitivity is negligible,
said pair of outer gages being diametrically spaced and each comprising at least one elongated strip centered about the radial position of said diaphragm at which the tangential stress component is zero and oriented longitudinally in a direction in which there is maximum longitudinal strain sensitivity, a plurality of interconnect areas of p-type silicon formed integrally on said diaphragm in patterns to have low resistance values and in locations to connect each gage of one pair between both gages of the other pair in a full bridge circuit configuration, and circuit means for producing current flow through said gages and interconnect areas and for detecting the additive opposite sign changes in resistance of said gages as a function of applied pressure.

2. A device as defined in claim 1 wherein said outer gages are oriented in the $<1\bar{1}1>$ direction.

3. A device as defined in claim 1 further including an additional pair of elongated strips of p-type silicon for temperature compensating purposes formed integrally on said diaphragm with desired resistance values and oriented longitudinally in the $<001>$ direction so as to be non-strain sensitive, each temperature compensating strip being connected to one interconnect area of a diagonally opposite pair of said interconnect areas.

References Cited

UNITED STATES PATENTS

| 3,329,023 | 7/1967 | Kurtz et al. | 73—398 |
| 3,402,609 | 9/1968 | Chiku et al. | 73—398 |
| 3,434,090 | 3/1969 | Chelner | 338—4 |
| 3,456,226 | 7/1969 | Vick | 73—88.5 X |

OTHER REFERENCES

Wall, W. E., Applications of Piezoresistance to Externally Excited Transducers, Endvco Tech. Paper, pp. 1–12, Sept. 11–14, 1967.

LOUIS R. PRINCE, Primary Examiner

J. W. ROSKOS, Assistant Examiner

U.S. Cl. X.R.

73—88.5; 338—4